United States Patent
You et al.

(10) Patent No.: US 10,268,186 B2
(45) Date of Patent: Apr. 23, 2019

(54) SYSTEM AND METHOD FOR DISPATCHING LOT

(71) Applicant: TAIWAN SEMICONDUCTOR MANUFACTURING CO., LTD., Hsinchu (TW)

(72) Inventors: Ren-Chyi You, Dongshan Shiang (TW); An-Wei Peng, Hsinchu (TW); Chang-Zong Liu, Hsinchu (TW); Yuang-Tsung Chen, Shoufeng Township (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 828 days.

(21) Appl. No.: 14/496,040

(22) Filed: Sep. 25, 2014

(65) Prior Publication Data

US 2016/0091891 A1  Mar. 31, 2016

(51) Int. Cl.
*G05B 19/418* (2006.01)
*G05B 19/00* (2006.01)

(52) U.S. Cl.
CPC ........... *G05B 19/4187* (2013.01); *G05B 2219/32276* (2013.01); *G05B 2219/45031* (2013.01); *Y02P 90/205* (2015.11)

(58) Field of Classification Search
CPC ...... G05B 19/4187; G05B 2219/32276; G05B 2219/45031; Y02P 90/205
USPC ........................................................ 700/100
See application file for complete search history.

(56) References Cited

U.S. PATENT DOCUMENTS

| | | | | | |
|---|---|---|---|---|---|
| 6,134,482 | A | * | 10/2000 | Iwasaki | G05B 19/41865 414/14 |
| 6,470,231 | B1 | * | 10/2002 | Yang | G06Q 10/04 700/100 |
| 7,085,614 | B1 | * | 8/2006 | Gartland | G05B 19/41865 700/100 |
| 2005/0071031 | A1 | * | 3/2005 | Lin | G05B 19/41865 700/101 |
| 2006/0079979 | A1 | * | 4/2006 | Giebels | G05B 19/41865 700/96 |
| 2007/0050093 | A1 | * | 3/2007 | Furukawa | H01L 21/67276 700/295 |
| 2008/0195241 | A1 | * | 8/2008 | Lin | G05B 19/41865 700/101 |

(Continued)

FOREIGN PATENT DOCUMENTS

JP        2007123809 A   *  5/2007

OTHER PUBLICATIONS

Derwent Description of JP2007123809A, 2007, 2pg. (Year: 2007).*

*Primary Examiner* — Ryan D. Coyer
(74) *Attorney, Agent, or Firm* — Maschoff Brennan (57) ABSTRACT

A method is disclosed that includes the operations below. A lot is dispatched for N process stages of process stages, according to arrival durations of the lot arrived at the N process stages and process durations of the lot predetermined to be processed at the N process stages, in which N is a positive integer. A first tool of tools at each one of the N process stages are assigned for the lot, in which the lot is configured to be dispatched to the first tool at a first process stage of the N process stages according to a first arrival duration of the arrival durations of the lot arrived at the first process stage and remain operation durations of the tools at the first process stage.

20 Claims, 5 Drawing Sheets

(56) References Cited

U.S. PATENT DOCUMENTS

2010/0278622 A1\* 11/2010 Huang .................... B66F 19/00
414/673

\* cited by examiner

SYSTEM AND METHOD FOR DISPATCHING LOT

BACKGROUND

Automated material handling systems are used in semiconductor fabrication facility to carry out automated functions more efficiently, consistently, and safely than can be done via manual means. Lots are transferred by the automated material handling systems to different process stages, and thus the lots are able to be automatically processed by different tools. Thus, AMHS have been widely used in the semiconductor fabrication.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
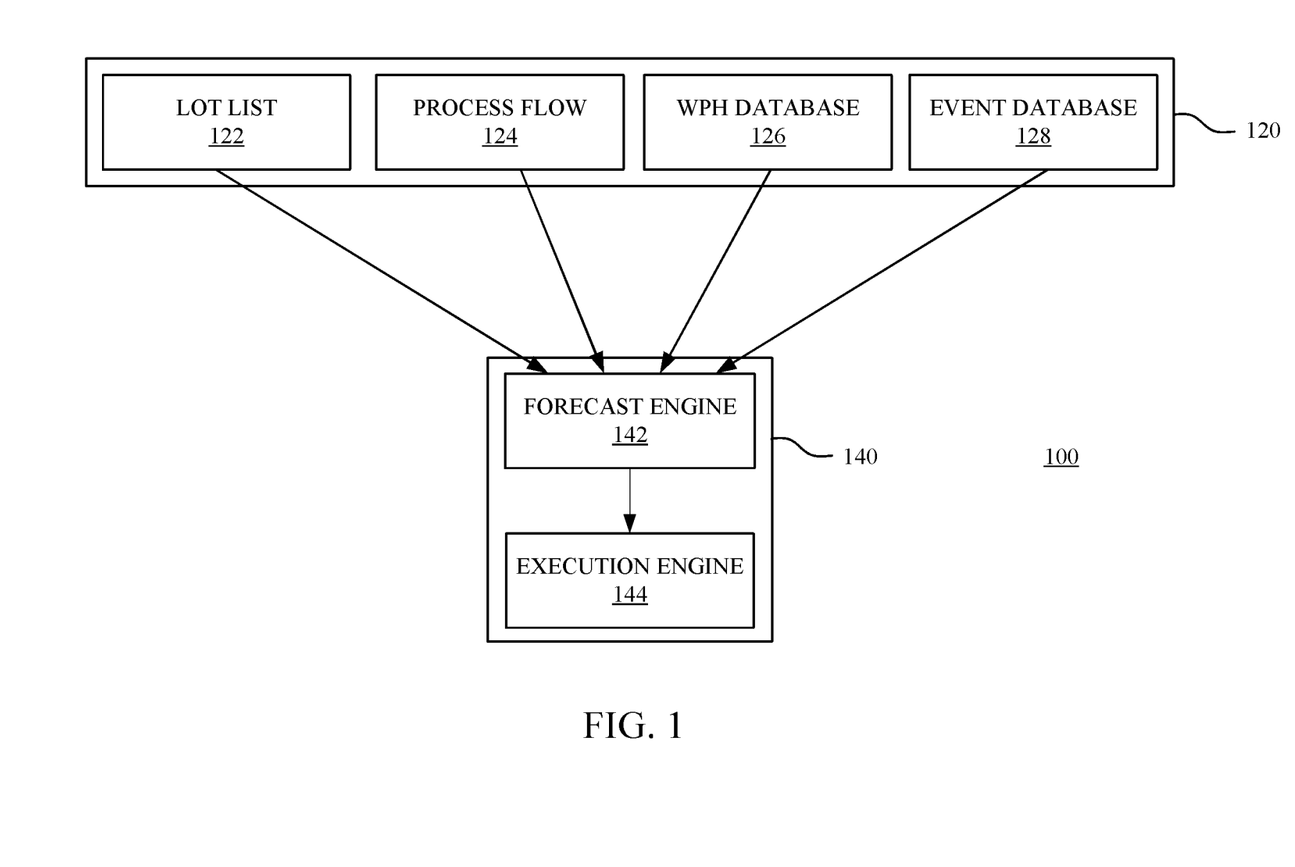
FIG. 1 is a system for dispatching a lot, in accordance with various embodiments of the present disclosure.

FIG. 1 is a system for dispatching lot, in accordance with various embodiments of the present disclosure.

As illustratively shown in FIG. 1, the system 100 includes a storage unit 120 and a processing unit 140. The storage unit 120 is configured to store a lot list 122 and a process flow 124. The processing unit 140 is coupled to the storage unit 120 for receiving information from the lot list 122 and the process flow 124. Thus, the processing unit 140 is able to automatically dispatch the lots according to the lot list 122 and the corresponding process flow for the lots.

In some embodiments, the process flow 124 includes a series of process stages, in which each of the process stages includes a number of tools for processing the lots. In some embodiments, the lots are wafer lots, and the process stages include a chemical vapor deposition (CVD) process, an etching process, a photoresist coating process, a heating process, an ion implantation process, etc. In further embodiments, the wafer lots are super hot run (SHR). When wafer lots are the SHR, the wafer lots are considered to be an urgent order for wafer fabrication. In other words, the SHR is required to be processed as efficiently as possible. As a result, tools at the process stages are preserved for processing the SHR.

In some embodiments, the processing unit 140 includes a forecast engine 142 and an execution engine 144. The forecast engine 142 is configured to dispatch the SHR for N process stages of the process stages according to arrival durations and process durations, in which N is a positive integer. The arrival durations are time intervals of the SHR arrived at the N process stages, and the process durations are time intervals of the SHR predetermined to be processed at the N process stages.

In other words, for an N-th process stage of the N process stages, an N-th process duration is an average time interval for the lots predetermined to be processed at the N-th process stages, and an N-th arrival duration is a time interval of the SHR arrived at 1st process stage and the process durations of the (N−1) process stages. In some embodiments, as shown in FIG. 1, the storage unit 120 is further configured to store a wafers per hour (WPH) database 126, in which the WPH database 126 records the process durations at the N process stages. Thus, the forecast engine 142 is able to obtain the information of the process durations at the N process stages, from the WPH database 126.

The execution engine 144 is configured to a specific tool of the tools at each of the N process stages for the SHR, according to the arrival durations and remain operation durations of the tools. With such configuration, the specific tools at the N process stages are preserved to process the SHR, and the SHR is thus processed with great efficiency.

In some embodiments, the storage unit 120 is a memory device, e.g., a SRAM, DRAM, or a hard disk, which is able to be accessed by the tools and the processing unit 140 in real time. The arrangement of the system 100 is given for illustrative purposes only. Various arrangements of the system 100 are within the contemplated scoped of the present disclosure.

Figure 2A:
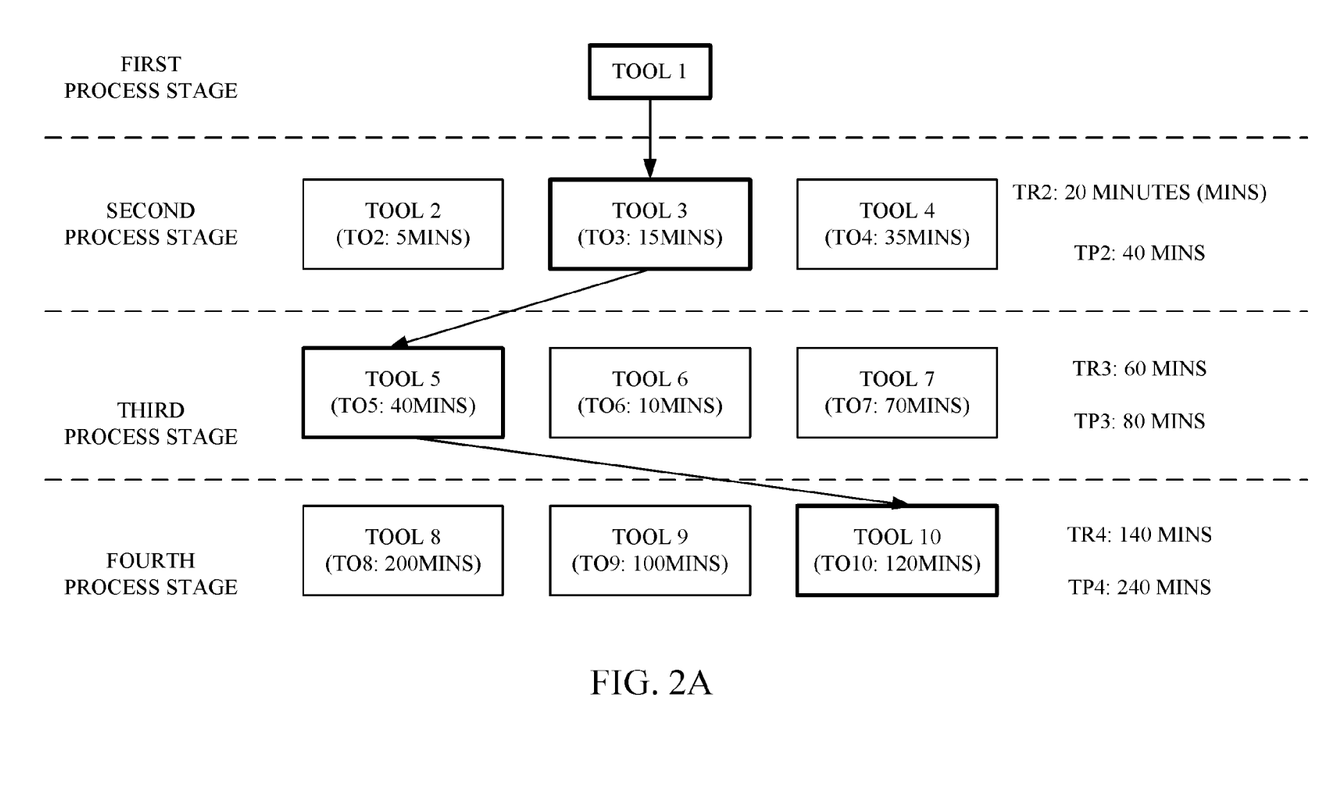
FIG. 2A is a schematic diagram illustrating of the SHR dispatched for a four process stages, in accordance with various embodiments of the present disclosure.
Figure 2B:
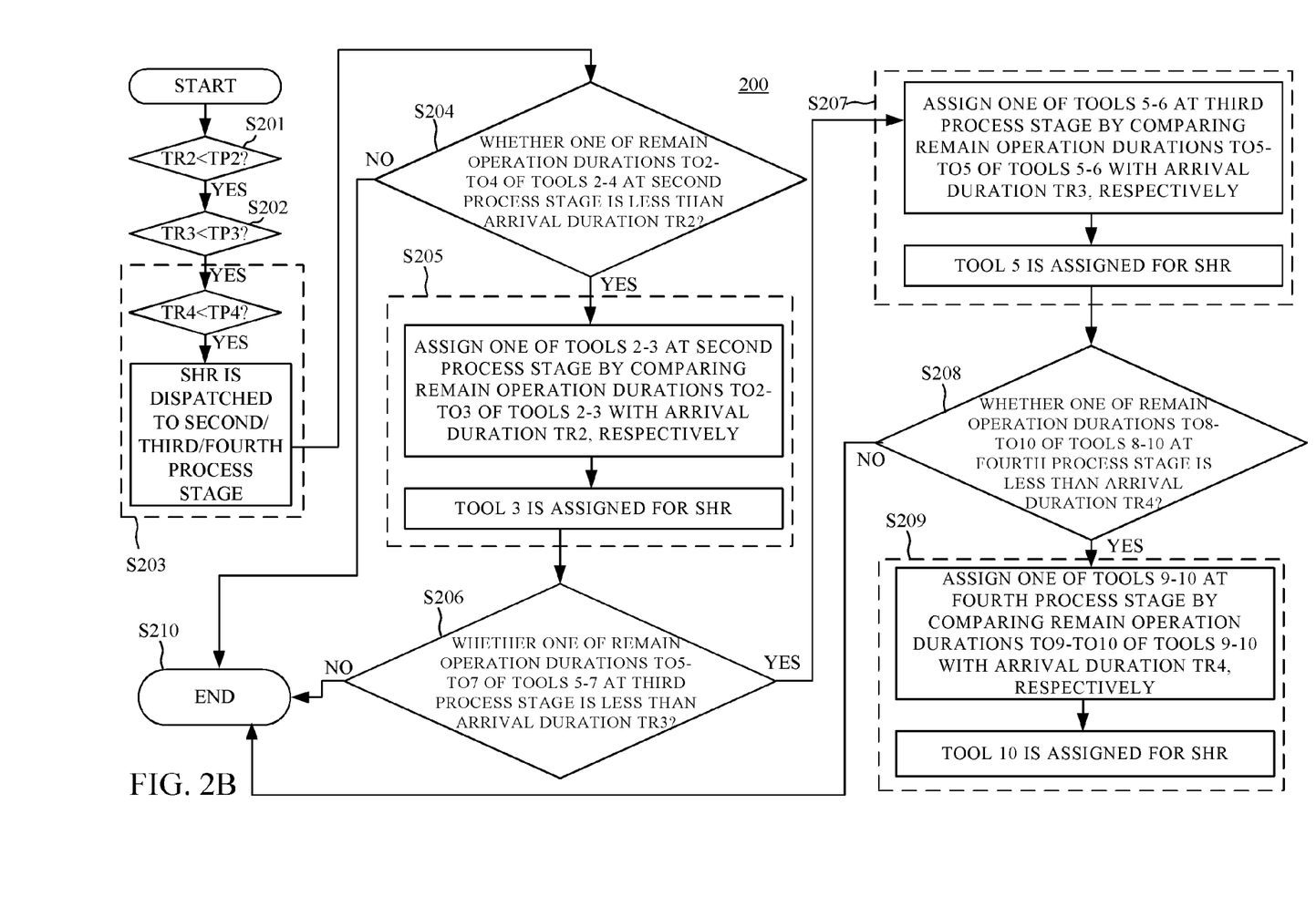
FIG. 2B is a flow chart of a method for dispatching the SHR in the four process stages shown in FIG. 2A, in accordance with various embodiments of the present disclosure.

FIG. 2A is a schematic diagram illustrating the SHR dispatched for a four process stages, in accordance with various embodiments of the present disclosure. FIG. 2B is a flow chart of a method for dispatching the SHR in the four process stages shown in FIG. 2A, in accordance with various embodiments of the present disclosure.

For illustration, the operations of the system 100 in FIG. 1 are described by the method 200 with reference to FIG. 2A and FIG. 2B. As shown in FIG. 2A, the processing unit 140 obtains information that there are four process stages for the SHR according to the lot list 122 and the process flow 124. Each of the four process stages includes three tools for processing the SHR. For illustration, the second process stage includes tool 2, tool 3, and tool 4. The third process stage includes tool 5, tool 6, and tool 7. The fourth process stage includes tool 8, tool 9, and tool 10. The SHR is now processed by the tool 1 at the first process stage, and is estimated to be arrived at the second process stage at 20 minutes. In other words, the arrival duration TR2 for the SHR arrived at the second process stage is 20 minutes. For further illustration, the process duration TP2 at the second process stage is 40 minutes, the process duration TP3 at the third process stage is 80 minutes, and the process duration TP4 at the fourth process stages is 240 minutes.

In the following descriptions, for simplicity, the moving time for the lots moved between the tools in different stages are considered to be zero. However, in some other embodiments, the arrival durations are calculated more precisely by considering actual time for the lots moving between the tools, e.g., moving from the tool 1 at the first process stage to each of the tools 2-4 at the second process stage.

In operation S201, the forecast engine 142 determines whether the arrival duration TR2 is less than the process duration TP2. As the arrival duration TR2 is 20 minutes and the process duration TP2 is 40 minutes, the forecast engines 142 thus determines that the arrival duration TR2 is less than the process duration TP2, and operation S202 is then performed.

In operation S202, the forecast engine 142 determines whether the arrival duration $TR_3$ is less than the process duration $TP_3$. As described above, for simplicity, the N-th arrival duration is considered to be the time of the SHR arrived at the N-th process stage. In other words, when the SHR is at the first process stage, the arrival duration $TR_3$ for the SHR arrived at the third process stage is estimated to be the sum of the arrival duration $TR_2$ and the process duration $TP_2$. Thus, the arrival duration $TR_3$ is calculated as: 20+40=60 minutes, by the forecast engine 142. Since the arrival duration $TR_3$ (60 minutes) is less than the process duration $TP_3$ (80 minutes), operation S203 is performed.

In operation S203, the forecast engine 142 further determines whether the arrival duration TR4 is less than the process duration TP4. Similarly, based on similar condition, the arrival duration TR4 is calculated by summing the arrival duration TR3 and the process duration TR3. The arrival duration TR4 is calculated as: 60+80=140 minutes, by the forecast engine 142. Since the arrival duration TR4 (140 minutes) is less than the process duration TP4 (240 minutes), the forecast engine 142 determines that the SHR is presently pre-dispatched to the second process stage, the third process stage and the fourth process stage, and operation S204 is then performed.

In operation S204, the execution engine 144 determines whether one of remain operation durations TO2-TO4 of the tools 2-4 at the second process stage is less than the arrival duration TR2. The remain operation duration is a time interval for the tool to process a present lot previously arrived at the tool. If there is one of remain operation durations of the tools 2-4 is less than the arrival duration TR2, operation S205 is performed. If not, operation S210 is performed.

For illustration, as shown in FIG. 2A, the remain operation duration TO2 of the tool 2 is 5 minutes, the remain operation duration TO3 of the tool 3 is 15 minutes, and the remain operation duration TO4 of the tool 4 is 35 minutes. As the remain operation duration TO4 (35 minutes) is greater than the arrival duration TR2 (20 minutes), the tool 4 is not considered to be pre-dispatched for the SHR by the execution engine 144. In other words, when the SHR arrives at the second process stage after 20 minutes, the tool 4 still processes the present lot previously arrived at the tool 4 for 15 minutes. If the tool 4 was assigned for the SHR, the SHR has to wait the tool 4 for 15 minutes after arrived at the second process stage. As a result, the process efficiency for the SHR is reduced. Thus, in this case, the execution engine 144 determines that the tool 4 is not to be pre-dispatched for the SHR. Instead, when the SHR arrives at the second process stage after 20 minutes, the process for the lots previously arrived at the tools 2-3 is completed, and thus the tools 2-3 are able to be assigned for the SHR.

In operation S205, the execution engine 144 assigns one of the tools 2-3 at the second process stage by comparing remain operation durations TO2-TO3 of tools 2-3 with the arrival duration TR2, respectively.

For illustration, the execution engine 144 compares a lost duration of the tool 2 with a lost duration of the tool 3. The lost durations are the time for the tools 2-3 being not operated. In other words, the lost duration of the tool 2 is an idle time of the tool 2, and the lost duration of the tool 3 is the idle time of the tool 3. As mentioned above, when the SHR arrives at the second process stage, the tools 2-3 are on standby. Thus, the lost duration of the tool 2 is calculated by the execution engine 144 from the time difference between the arrival duration TR2 and the remain operation duration TO2. Similarly, the lost duration of the tool 3 is also calculated by the execution engine 144 from the time difference between the arrival duration TR2 and the remain operation duration TO3. Since the lost duration of the tool 3, i.e., 20-15=5 minutes, is less than the lost duration of the tool 2, i.e., 20-5=15 minutes, the execution engine 144 assigns the tool 3 for the SHR. Thus, the tool 2 with a higher lost duration is able to immediately process other lots. With such configuration, the production capacity of wafer fabrication is maintained, and the process efficiency for SHR is improved.

In some embodiments, when the execution engine 144 finds that there is only one of the remain operation duration TO2-TO4 at the second process stage is less than the arrival duration TR2 in operation S204, the execution engine 144 assigns the corresponding one of the tools 2-4 for the SHR without performing operation S205.

In operation S206, the execution engine 144 determines whether one of remain operation durations TO5-TO7 of the tools 5-7 at the third process stage is less than the arrival duration TR3. If there is one of remain operation durations TO5-TO7 is less than the arrival duration TR3, operation S207 is performed. If not, operation S210 is performed.

For illustration, as the remain operation duration TO7 (70 minutes) of the tool 7 is greater than the arrival duration TR3 (60 minutes), the tool 7 is not be dispatched for the SHR by the execution engine 144. On other hand, as both of the remain operation duration TO5 (40 minutes) of the tool 5 and the remain operation duration TO6 (40 minutes) of the tool 6 is greater than the arrival duration TR3 (60 minutes), the tools 5-6 are able to be assigned for the SHR.

In operation S207, the execution engine 144 assigns one of the tools 5-6 at the third process stage by comparing remain operation durations TO5-TO6 of the tools 5-6 with the arrival duration TR3, respectively.

For illustration, the execution engine 144 compares a lost duration of the tool 5 with a lost duration of the tool 6. The lost duration of the tool 5 is calculated by the execution engine 144 from the time difference between the arrival duration TR3 and the remain operation duration TO5. Similarly, the lost duration of the tool 6 is also calculated by the execution engine 144 from the time difference between the arrival duration TR3 and the remain operation duration TO6. Since the lost duration of the tool 5, i.e., 60-40=20 minutes, is less than the lost duration of the tool 6, i.e., 60-10=50 minutes, the execution engine 144 assigns the tool 5 for the SHR.

In operation S208, the execution engine 144 determines whether one of remain operation durations TO8-TO10 of the tools 8-10 at the fourth process stage is less than the arrival duration TR4. If there is one of remain operation durations TO8-TO10 is less than the arrival duration TR4, operation S209 is performed. If not, operation S210 is performed.

For illustration, as shown in FIG. 2B, the remain operation duration TO8 of the tool 8 is 200 minutes, the remain operation duration TO9 of the tool 9 is 100 minutes, and the remain operation duration TO10 of the tool 10 is 120 minutes. As the remain operation duration TO8 (200 minutes) is greater than the arrival duration TR4 (140 minutes), the tool 8 is not considered to be assigned for the SHR by the execution engine 144.

In operation S209, the execution engine 144 assigns one of the tools 9-10 at the third process stage by comparing remain operation durations TO9-TO10 of the tools 9-10 with the arrival duration TR4, respectively.

Similarly, the execution engine 144 compares a lost duration of the tool 9 with a lost duration of the tool 10. The lost duration of the tool 9 is calculated by the execution engine 144 from the time difference between the arrival duration TR4 and the remain operation duration TO9. The lost duration of the tool 10 is calculated by the execution engine 144 from the time difference between the arrival duration TR4 and the remain operation duration TO10. Since the lost duration of the tool 10, i.e., 140-120=20 minutes, is less than the lost duration of the tool 9, i.e., 140-100=40 minutes, the execution engine 144 assigns the tool 10 for the SHR.

In operation S210, the system 100 checks there are no appropriate tools to be assigned for the SHR, and the operations of the system 100 are thus completed. The SHR will be initiatively notified by the specific tool at the next process stage, and the SHR is dispatched to the specific tool when the remain operation of the specific tool is completed.

By performing the method 200, the system 100 accurately forecasts the arrival durations TR1-TR4 of the four process stages, and thus the system 100 pre-assigns the tool 3 at the second process stage, the tool 5 at the third process stage and the tool 10 at the fourth process stage for the SHR. With such configuration, both of the production capacity and the process efficiency for SHR are improved.

In some embodiments, the system 100 is integrated with automated material handling systems (AMHS). In some embodiments, the processing unit 140 is a controller chip. In some other embodiments, the forecast engine 142 and the execution engine 144 are implemented with individual controller chips. In various embodiments, the processing unit 140 is a design tool carried on a non-transitory computer-readable medium storing the method 200. In other words, the processing unit 140 is implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized.

The numbers of the process stages in FIG. 2A and the operations of the method 200 in FIG. 2B are given for illustrative purposes. Various numbers of the process stages in FIG. 2A are able to be applied with the method 200, and those are considered to be within the contemplated scope of the present disclosure.

Figure 3:
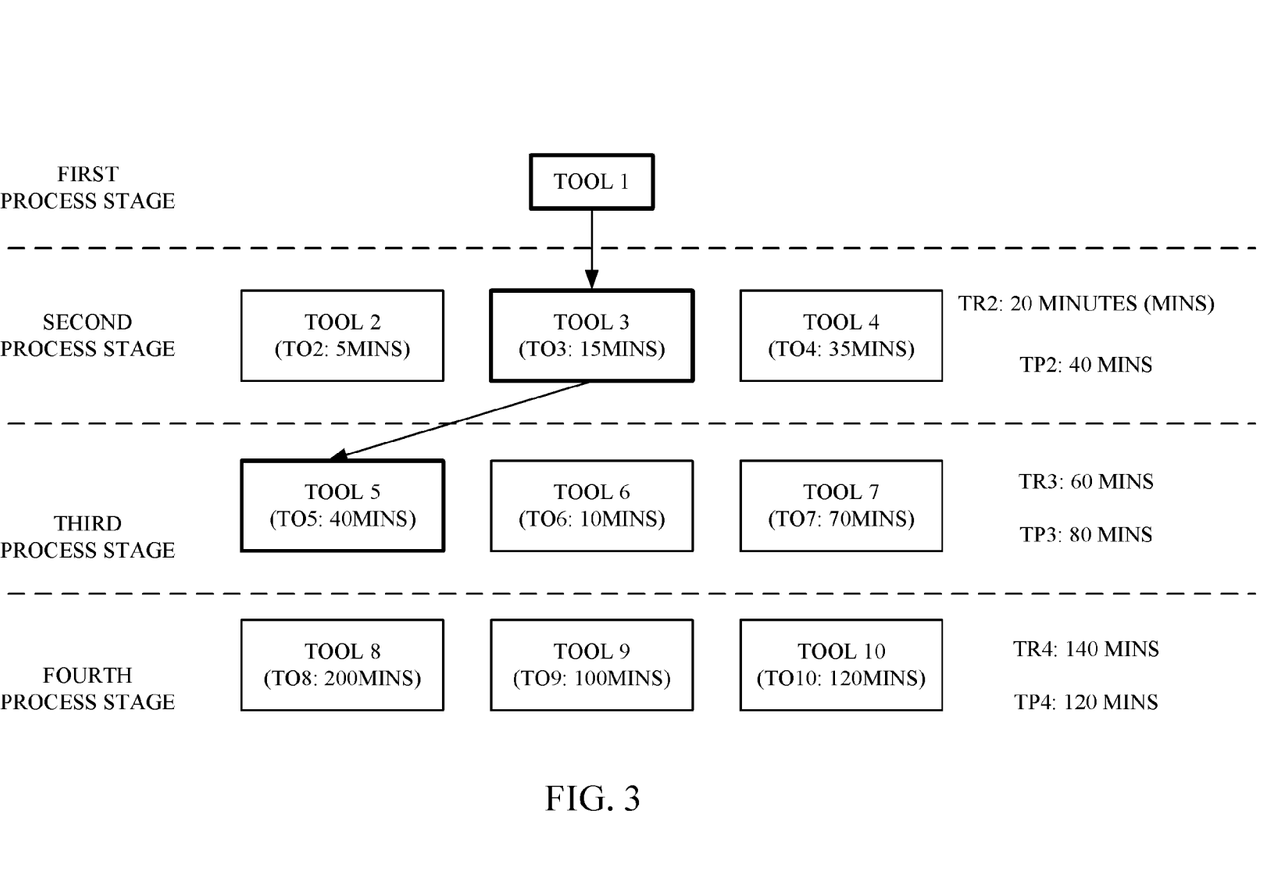
FIG. 3 is a schematic diagram illustrating of the SHR dispatched for a four process stages, in accordance with various embodiments of the present disclosure.

FIG. 3 is a schematic diagram illustrating of the SHR dispatched for a four process stages, in accordance with various embodiments of the present disclosure.

Compared with the FIG. 2B, the process duration TP4 at the fourth process stage in FIG. 3 is 120 minutes. In this condition, the forecast engine 142 determines that the arrival duration TR4 (140 minutes) is greater than the process duration TP4 (120 minutes) in operation S203. Thus, the forecast engine 142 determines that the SHR is only able to be presently pre-dispatched to the second process stage and the third process stage.

Explained in a different way, during operations S201-S203, the forecast engine 142 determines that the number of process stages to which the SHR is able to be pre-dispatched for efficient process. As the process duration TP4 is less than the arrival duration TR4, the operations of the fourth process stage is unable to be predicted when the SHR is processed at the first process stage. Thus, as shown in FIG. 3, the forecast engine 142 only dispatches the SHR to the second process stage and the third process stage.

Therefore, it is understood that operations S201-S207 and operation S210 of the method 200 are performed under the condition shown in FIG. 3. The operations S201-S207 and operation S210 of the method 200 for the process stages in FIG. 3 are similar with the operations S201-S207 and operation S210 of the method 200 for the process stages in FIG. 2A, and thus the repetitious descriptions are not given here.

Figure 4:
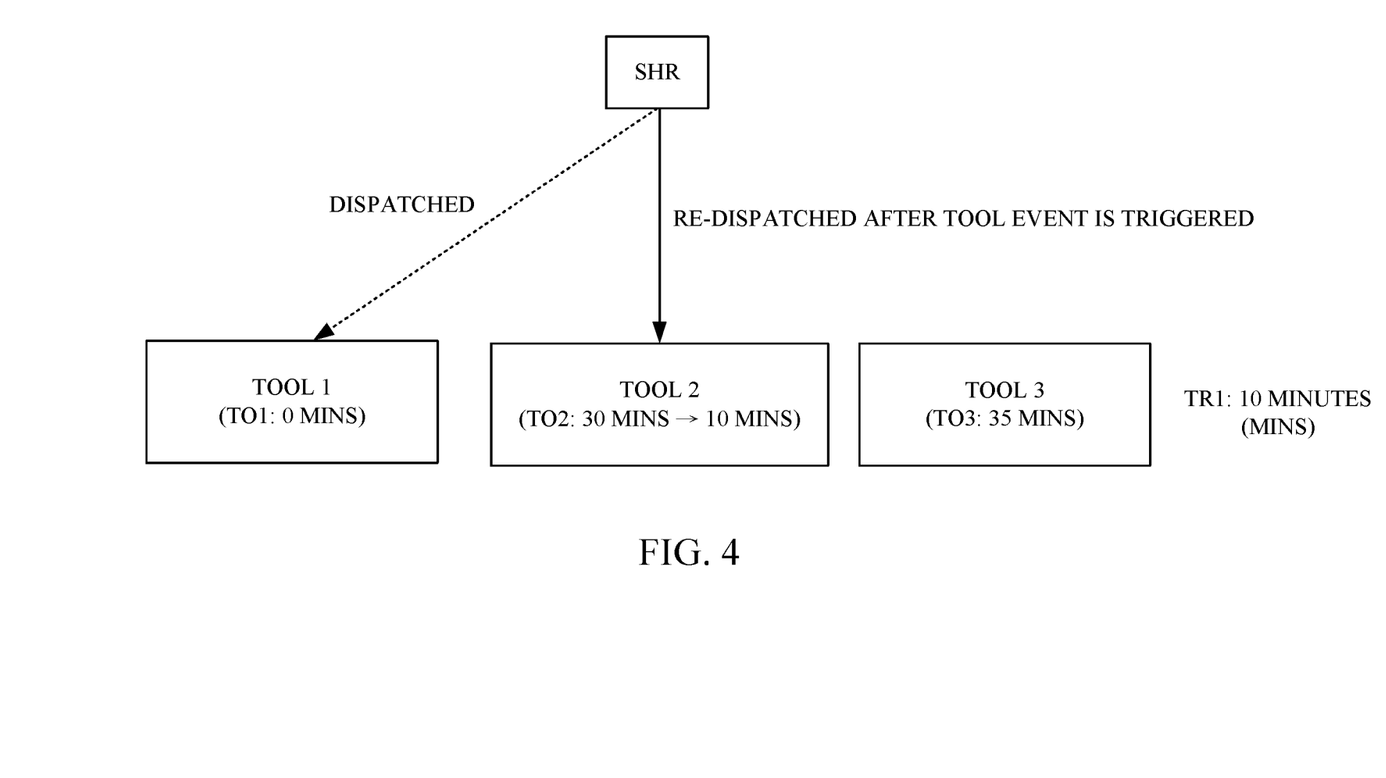
FIG. 4 is a schematic diagram illustrating of a tool event is triggered, in accordance with various embodiments of the present disclosure.

FIG. 4 is a schematic diagram illustrating of a tool event is triggered, in accordance with various embodiments of the present disclosure.

Reference is made to both of FIG. 1 and FIG. 4. As illustratively shown in FIG. 1, in some embodiments, the storage unit 120 is further configured to store an event database 128. The event database 128 is configured to record tool events on the tool at the process stages by communicating with the tools at each of the process stages. The processing unit 140 is configured to detect whether one of tool events is triggered in accordance with the event database, and to re-assign another tool for the SHR.

For illustration, as illustratively shown in FIG. 4, the arrival duration TR1 for the SHR arrived at the next process stage is 10 minutes. The remain operation duration TO1 of the tool 1 is 0 minutes, the remain operation duration TO2 of the tool 2 is 30 minutes, and the remain operation duration TO3 of the tool 3 is 35 minutes. Since there is only the remain operation duration TO1 less than the arrival duration TR1, the tool is thus assigned for the SHR by the execution engine 144.

As shown in FIG. 4, a tool event at the tool 2 is triggered, and the event database 128 is thus updated by the tool 2. For illustration, the tool event includes any type of unexpected exceptions, such as a tool down event, a tool process complete event, etc, which are enough to reduce the remain operation duration of the tool. After the tool event is triggered, the remain operation duration TO2 is changed from 30 minutes to the 10 minutes. As a result, both of the remain operation duration TO1 and the remain operation duration TO2 are less than the arrival duration TR1. Thus, the lost duration of the tool 1 is 10 minutes, and the lost duration of the tool 2 is 0 minutes. Since the lost duration of the tool 2 is less than the lost duration of the tool 1 after the tool event is triggered, the execution engine 144 re-dispatches the SHR to the tool 2. The tool 1 with a higher lost duration is thus able to process another lots. With such configuration, the production capacity of wafer fabrication industry is improved by dynamically re-arranging the tools for the SHR in real-time.

In some approaches, the tools are preserved for processing the SHR at each process stages at initial. However, the SHR is processed with a longer cycle time if wrong tools are preserved. Further, as the tools are preserved at initial, high lost durations are thus caused, resulting in a much lower production capacity. In addition, the tools are required to be re-assigned for the SHR from manual judgments by operators when the tool events are triggered. As a result, both the production capacity and the process efficiency for SHR are reduced.

Instead, with the configurations illustrated in FIG. 1 together with the operations illustrated in FIG. 2B, the SHR is able to be precisely pre-dispatched to the process stages, and both of the cycle time for processing the SHR and the impacts on lost durations are reduced. Further, a much appropriate tool is automatically assigned for the lot when unexpected exceptions of the tools are generated. As a result, the process efficiency for SHR is improved under any conditions.

In some embodiments, a method is disclosed that includes the operations below. A lot is dispatched for N process stages of process stages, according to arrival durations of the lot arrived at the N process stages and process durations of the lot predetermined to be processed at the N process stages, in which N is a positive integer. A first tool of tools at each one of the N process stages are assigned for the lot, in which the first tool at a first process stage of the N process stages is configured to be assigned for the lot according to a first arrival duration of the arrival durations of the lot arrived at the first process stage and remain operation durations of the tools at the first process stage.

Also disclosed is a system that includes a storage unit and a processing unit. The storage unit is configured to store a process flow for a super hot run (SHR), in which the process flow includes process stages, and each of the process stages includes a first tool and a second tool. The processing unit is configured to dispatch the SHR for N process stages of the process stages, according to arrival durations of the SHR arrived at the N process stages and process durations of the SHR predetermined to be processed at the N process stages, and to assign the first tool at each one of the N process stages for the SHR. The first tool at a first process stage of the N process stages is configured to be assigned for the SHR, according to a first arrival duration of the arrival durations of the lot arrived at the first process stage, a first remain operation duration of the first tool at the first process stage, and a second remain operation duration of the second tool at the first process stage, in which N is a positive integer, and the first arrival duration is greater than the first remain operation duration.

Also disclosed is a non-transitory computer readable medium for performing a method that includes the operations below. A super hot run (SHR) is dispatched for N process stages of process stages, according to arrival durations of the SHR arrived at the N process stages and process durations of the SHR predetermined to be processed at the N process stages, in which N is a positive integer. A first tool of tools at each one of the N process stages are assigned for the SHR, in which the first tool at a first process stage of the N process stages is configured to be assigned for the SHR according to a first arrival duration of the arrival durations of the SHR arrived at the first process stage and remain operation durations of the tools at the first process stage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    dispatching a lot for N process stages of a plurality of process stages, by a processing unit, the processing unit configured to dispatch the lot in response to determining that arrival times of the lot arrived at the N process stages are less than processing times of the lot predetermined to be processed at the N process stages, N being a positive integer;
    assigning a first tool of a plurality of tools at each one of the N process stages for the lot, the first tool at a first process stage of the N process stages configured to be assigned for the lot by the processing unit, the processing unit configured to assign the first tool for the lot to increase a production capacity of the tools by comparing a first arrival time of the arrival times of the lot arrived at the first process stage and remaining operation times of the tools at the first process stage, wherein assigning the first tool for the lot comprises:
        determining whether a first lost time of a plurality of lost times is a smallest one of the plurality of lost times, wherein the first lost time is a time difference between the first arrival time and a first remaining operation time of the remaining operation times of the first tool, and the plurality of lost times are time differences between the other arrival times and other remaining operation times corresponding to the other tools at the first process stage, wherein when the first lost time is the smallest one of the plurality of lost times, the first tool is assigned for the lot and configured to perform a process in the first process stage; and generating at least one semiconductor device from the lot based on the dispatching and the assigning.

2. The method of claim 1, wherein assigning the first tool for the lot further comprises:

determining whether the first arrival time is greater than the first remaining operation time of the remaining operation times of the first tool.

3. The method of claim 2, further comprising:

detecting whether a tool event of the tools at the first process stage is triggered; and re-assigning a second tool of the tools at the first process stage for the lot;

wherein after the tool event is triggered, a second lost time of the lost times is the smallest one of the lost times, and the first arrival time is greater than a second remaining operation time of the remaining operation times of the second tool after the tool event is triggered, wherein the second lost time is a time difference between the first arrival time and the second remaining operation time.

4. The method of claim 1, wherein dispatching the lot for the N process stages comprises:

determining whether an N-th arrival time of the arrival times of the lot arrived at an N-th process stage is less than an N-th processing time of the processing times at the N-th process stage of the N process stages;

wherein an (N+1)th arrival time of the lot arrived at an (N+1)th process stage is greater than an (N+1)th processing time at the (N+1)th process stage.

5. The method of claim 4, wherein the (N+1)th arrival time is a sum of the N-th arrival time and the N-th processing time.

6. A system, comprising:

a storage unit configured to store a process flow for a super hot run (SHR), wherein the process flow comprises a plurality of process stages, and each of the process stages comprises a first tool and a second tool; and a processing unit configured to dispatch the SHR for N process stages of the process stages in response to determining that arrival times of the SHR arrived at the N process stages are less than processing times of the SHR predetermined to be processed at the N process stages, and to assign the first tool at each one of the N process stages for the SHR, and to initiate generation of at least one semiconductor from the SHR;

wherein the first tool at a first process stage of the N process stages is configured to be assigned for the SHR by the processing unit to increase a production capacity of the first tool by comparing a first arrival time of the arrival times of the SHR arrived at the first process stage, a first remaining operation time of the first tool at the first process stage, and a second remaining operation time of the second tool at the first process stage, wherein N is a positive integer, and the first arrival time is greater than the first remaining operation time, and wherein the processing unit is configured to assign the first tool at the first process stage for the SHR when a first lost time is the smallest one of the first lost time and a second lost time, wherein the first lost time is a time difference between the first arrival time and the first remaining operation time, and the second lost time is a time difference between the first arrival time and the second remaining operation time.

7. The system of claim 6, wherein the processing unit is configured to dispatch the SHR for N process stages by determining whether an N-th arrival time of the arrival times of the SHR arrived at an N-th process stage is less than an N-th processing time of the processing times at the N-th process stage of the N process stages;

wherein an (N+1)th arrival time of the SHR arrived at an (N+1)th process stage is greater than an (N+1)th processing time at the (N+1)th process stage.

8. The system of claim 7, wherein the (N+1)th arrival time is a sum of the N-th arrival time and the N-th processing time.

9. The system of claim 6, wherein the storage unit is further configured to store a wafers per hour (WPH) database, and the WPH database is configured to record the processing times of the SHR at each one of the N process stages;

wherein the processing unit is coupled to the storage unit to obtain information of the processing times.

10. The system of claim 6, wherein the processing unit is configured to assign the first tool at the first process stage for the SHR when the first arrival time is less than the second remaining operation time.

11. The system of claim 6, wherein the processing unit is configured to assign the first tool at the first process stage for the SHR, when the first arrival time is greater than both of the first remaining operation time and the second remaining operation time.

12. The system of claim 6, wherein each of the process stages further comprises a third tool, and the processing unit is configured to assign the first tool at the first process stage for the SHR by comparing the first arrival time, the first remaining operation time, the second remaining operation time, and a third remaining operation time of the third tool, wherein the processing unit assigns the first tool for the SHR when first arrival time is less than both of the second remaining operation time and the third remaining operation time.

13. The system of claim 12, wherein the processing unit assigns the first tool for the SHR when the first arrival time is greater than the second remaining operation time and less than the third remaining operation time, and a first lost time is less than a second lost time;

wherein the first lost time is a time difference between the first arrival time and the first remaining operation time, and the second lost time is a time difference between the first arrival time and the second remaining operation time.

14. The system of claim 6, wherein the storage unit further comprises an event database, the event database is configured to record a plurality of tool events by communicating with the first tool and the second tool.

15. The system of claim 14, wherein the processing unit is further configured to detect whether one of the tool events at the first process stage is triggered according to the event database, and to re-assign the second tool at the first process stage for the SHR;

wherein after the one of the tool events is triggered, the first arrival time is greater than the second remaining operation time, and a first lost time is less than a second lost time;

wherein the first lost time is a time difference between the first arrival time and the first remaining operation time, and the second lost time is a time difference between the first arrival time and the second remaining operation time.

16. A non-transitory computer readable medium for performing a method, the method comprising:
dispatching a super hot run (SHR) for N process stages of a plurality of process stages by a processing unit, the processing unit configured to dispatch the SHR in response to determining that arrival times of the SHR arrived at the N process stages are less than processing times of the SHR predetermined to be processed at the N process stages, N being a positive integer;
assigning a first tool of a plurality of tools at each one of the N process stages for the SHR, the first tool at a first process stage of the N process stages being configured to be assigned for the SHR by the processing unit, the processing unit configured to assign the first tool for the SHR to increase a production capacity of the tools by comparing a first arrival time of the arrival times of the SHR arrived at the first process stage and remaining operation times of the tools at the first process stage, wherein assigning the first tool for the SHR comprises:
determining whether a first lost time of lost times is a smallest one of lost times, wherein the first lost time is a time difference between the first arrival time and a first remaining operation time of the remaining operation times of the first tool, and the lost times are time differences between the other arrival times and the other remaining operation times corresponding to the other tools at the first process stage,
wherein when the first lost time is the smallest one of the lost times, the first tool is assigned for the SHR and configured to perform a process in the first process stage; and
generating at least one semiconductor device from the SHR based on the dispatching and the assigning.

17. The non-transitory computer readable medium of claim 16, wherein assigning the first tool for the SHR further comprises:
determining whether the first arrival time is greater than the first remaining operation time of the remaining operation times of the first tool.

18. The non-transitory computer readable medium of claim 16, wherein the method further comprises:
detecting whether a tool event of the tools at the first process stage is triggered; and
re-dispatching the SHR to a second tool of the tools at the first process stage;
wherein after the tool event is triggered, a second lost time of the lost times is a smallest one of the lost times, and the first arrival time is greater than a second remaining operation time of the remaining operation times of the second tool after the tool event is triggered,
wherein the second lost time is a time difference between the first arrival time and the second remaining operation time.

19. The non-transitory computer readable medium of claim 16, wherein dispatching the SHR for the N process stages comprises:
determining whether an N-th processing time of the processing times at an N-th process stage of the N process stages is greater than an N-th arrival time of the arrival times of the SHR arrived at the N-th process stage;
wherein an (N+1)th processing time at an (N+1)th process stage is less than an (N+1)th arrival time of the SHR arrived at the (N+1)th process stage.

20. The non-transitory computer readable medium of claim 19, wherein the (N+1)th arrival time is a sum of the N-th arrival time and the N-th processing time.

* * * * *